United States Patent [19]

Haataja et al.

[11] 4,221,751

[45] Sep. 9, 1980

[54] ARTICLES MOLDED FROM PAPERMILL SLUDGE

[75] Inventors: Bruce A. Haataja, Lake Linden; Anders E. Lund, Houghton, both of Mich.

[73] Assignee: Board of Control of Michigan Technological University, Houghton, Mich.

[21] Appl. No.: 18,121

[22] Filed: Mar. 7, 1979

[51] Int. Cl.[2] .............................................. B29J 5/00

[52] U.S. Cl. .................................... 264/119; 264/115; 264/122

[58] Field of Search ................ 264/115, 119, 120, 122

[56] References Cited

U.S. PATENT DOCUMENTS

| | | | |
|---|---|---|---|
| 3,354,248 | 11/1967 | Haas et al. | 264/119 |
| 3,373,233 | 3/1968 | Rondum | 264/119 |
| 3,927,235 | 12/1975 | Chow | 264/122 |
| 4,058,580 | 11/1977 | Flanders | 264/122 |

*Primary Examiner*—Donald E. Czaja
*Assistant Examiner*—James R. Hall
*Attorney, Agent, or Firm*—Michael, Best & Friedrich

[57] ABSTRACT

An article, such as a pallet having a substantially flat deck member and a plurality of hollow legs projecting from the deck member, is molded as a one-piece unit from a papermill sludge. Dried, comminuted papermill sludge is blended with a fibrous reinforcing material, preferably a cellulosic material such as fibrous bark particles, and a resinous particle board binder, the resulting mixture of furnish is formed into a loosely fitted mat, and the mat is placed between dyes of a mold and press and compressed to substantially the desired shape under temperature and pressure conditions sufficient to bond the sludge and bark particles together.

15 Claims, 7 Drawing Figures

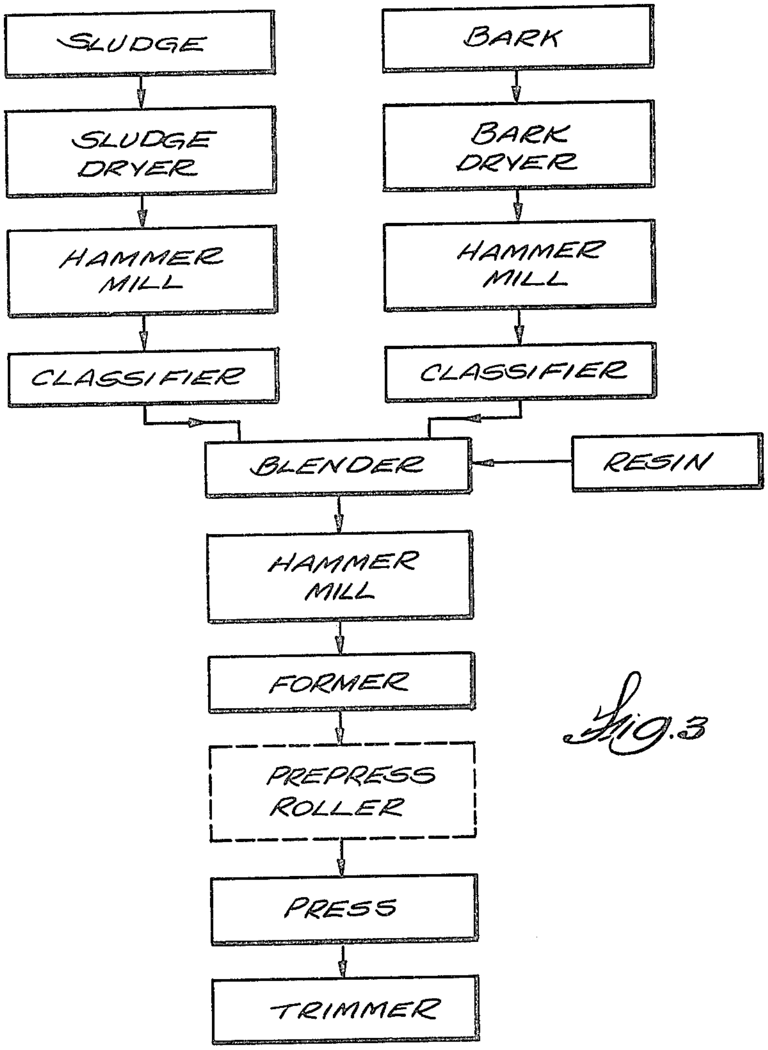
Fig. 3
Fig. 1
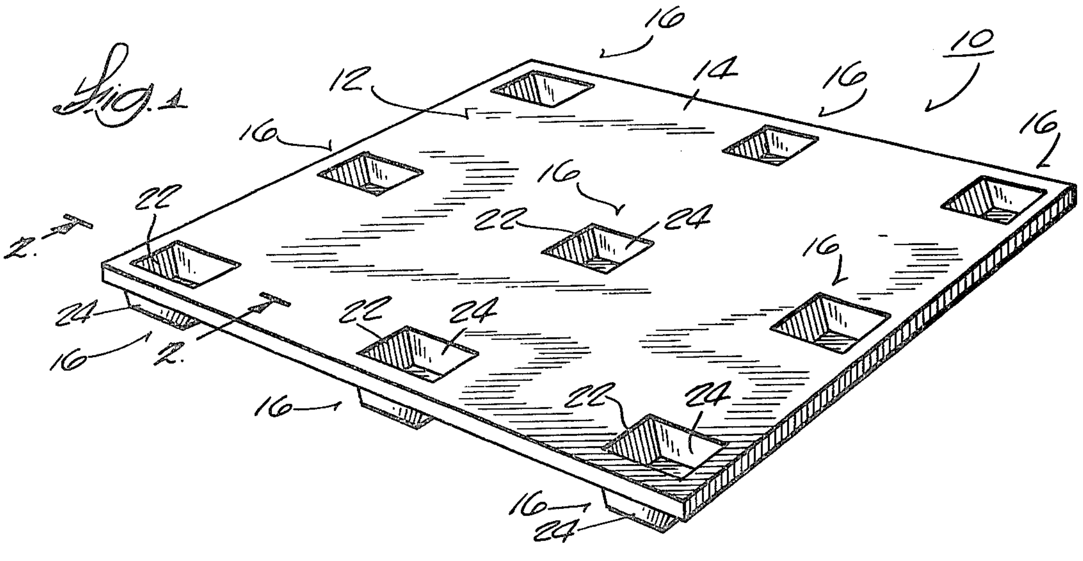

ARTICLES MOLDED FROM PAPERMILL SLUDGE

FIELD OF THE INVENTION

This invention relates to articles made from papermill sludge. In one aspect, the invention relates to one-piece material handling pallets molded from papermill sludge.

In the manufacture of paper, various materials are added to the paper pulp prior to and during the sheet-forming operation for the purpose of producing desired properties in the finished paper, such as proper surface, opacity, strength and feel. For example, finely ground inorganic fillers, such as talc, certain clays, calcium carbonate, blanc fixe and titanium dioxide, are added to all papers, except absorbent types (tissue of blotting paper), to improve surface smoothness, whiteness, printability and opacity. Sizing agents, such as soaps, gelatins and rosins (with alum), wax emulsions and starches, are added to most papers for improving resistance to penetration by liquids. Also, coloring agents, such as acid, basic, direct and sulfur dyes and natural and synthetic pigments are added to most papers.

Substantial quantities of water are recovered during the sheet forming operation and recycled to the process after filtering. The solid residue or so-called papermill sludge separated from the recovered water primarily contains wood fibers and additive materials, particularly filler such as clay. Uses for this sludge are quite limited and, consequently, it is often disposed of as waste. Thus, some effort has been made to develop new uses for this waste product.

SUMMARY OF THE INVENTION

A principal object of the invention is to provide a simplified method for making articles, such as material handling pallets, from a papermill sludge.

Another object of the invention is to provide a structural member, having a main body and non-planar portions displaced from the major portion of the body, molded as a one-piece unit from papermill sludge.

A further object of the invention is to provide a material handling pallet molded from papermill sludge and having strength characteristics comparable to standard pallets made from stick lumber.

Other objects, aspects and advantages of the invention will become apparent to those skilled in the art upon reviewing the following detailed description, the drawing and the appended claims.

Even though papermill sludges contain substantial amounts of wood fibers, articles formed from a papermill sludge and a binder do not have adequate structural strength for many purposes. In accordance with the invention, the structural strength is increased by admixing a fibrous reinforcing material, preferably a fibrous cellulosic material such as bark particles and a resinous particle board binder, such as a thermosetting resin or an organic polyisocyanate, with the papermill sludge in dried, comminuted form and compression molding the resulting mixture or furnish into the desired shape of the article.

In a preferred method, the comminuted papermill sludge is admixed with the fibrous reinforcing material and resinous particle board binder, the resulting mixture or furnish is deposited as a loosely-felted mat on one part of an open mold or press including two separate parts defining a mold chamber having the shape of a pallet, the mold is closed, and sufficient heat and pressure is applied to the mat to compress it into substantially the desired shape and size of the pallet.

In one embodiment, a mat of substantially uniform thickness is formed outside the mold and this mat is placed between the male and female dies of the mold.

In another embodiment, a mat is formed outside the mold as described in the previous paragraph and mounds of furnish is added on top of the mat at locations corresponding to the leg-forming cavities of the female die.

In a further embodiment, the leg-forming cavities of the female die are first substantially filled with furnish and the mat is then placed between the male and female dies.

In a still further embodiment, the mat is formed directly on the female dies or a remote caul which has a shape conforming with the female die and is subsequently placed over the female die. This technique and those described in the two preceding paragraphs are particularly advantageous for molding longer or deeper leg members.

The pallet provided by the invention includes a deck member having a major plane and a plurality of hollow leg members projecting integrally from the deck member, each leg member having a bottom wall spaced from the deck member and side walls inclining outwardly from the bottom wall toward the deck member. The deck and leg members are molded as a one-piece unit from a mixture of dried, comminuted papermill sludge, a fibrous reinforcing material and a resinous particle board binder. The side walls of the leg members can extend at an angle of about 60° or less relative to the major plane of the deck member and can have an average thickness which is about 70–110% of the average thickness of the deck member.

BRIEF DESCRIPTION OF THE DRAWINGS

FIG. 1 is a perspective view of a pallet incorporating various features of the invention.

FIG. 3 is a schematic flow diagram illustrating various steps of preferred process for molding pallets of the invention from papermill sludge and bark.

DESCRIPTION OF THE PREFERRED EMBODIMENTS

The invention relates to articles molded from a papermill sludge, such as support members including a main body having a major plane and non-planar portions displaced from that major plane molded as a one-piece unit. The invention is particularly adaptable to material handling pallets and will be described in connection therewith.

Figure 2:
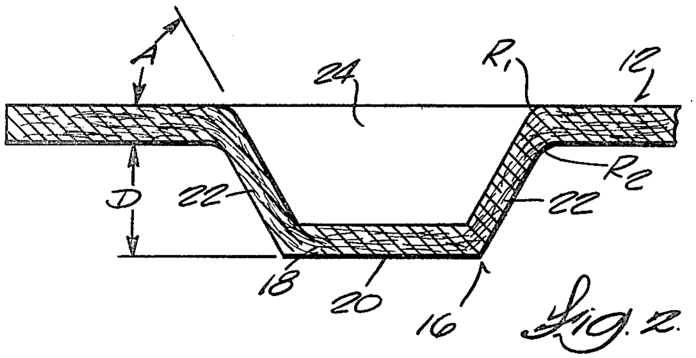
FIG. 2 is a sectional view taken generally along line 2—2 in FIG. 1.

Illustrated in FIGS. 1 and 2 is a pallet 10 including a generally flat, rectangular deck member 12 having a substantial uniform wall thickness and a flat upper surface 14 which serves as a supporting plane. Projecting downwardly from the deck member 12 is a plurality (e.g., 9) of hollow leg members 16 adapted to serve as supporting pads for the pallet. In the specific construction illustrated, each of the leg members 16 (FIG. 2) includes a bottom wall 18 having a flat bottom surface 20 and two opposed pairs of sidewalls 22 and 24. The bottom surface 20 of the bottom wall 18 is spaced from the underneath surface of the deck member 12 a sufficient distance D to permit entry of the tines of a fork lift beneath the deck member.

The deck member 12 and the leg members 16 are molded as a one-piece unit from a mixture of a papermill sludge, a fibrous reinforcing material and a suitable resinous particle board binder as described below. The sidewalls 22 and 24 of the leg members 16 are inclined or tapered to facilitate molding and also to permit nesting of several pallets into a compact stack so as to minimize the space required for shipment and storage. In the specific construction illustrated, the sidewalls 22 and 24 are substantially flat and the leg members 16 have a general form of an inverted, truncated hollow pyramid. If desired, leg member 16 can be formed in other suitable cross-sectional shapes, e.g., in the form of an inverted, truncated hollow cone.

As used herein, the term "papermill sludge" means the solid residue separated from water recovered from various commercial paper making processes. While the composition of the papermill sludge varies considerably depending upon the particular paper making process, the major ingredients are relatively find wood fibers, usually about 40 to 70 weight %, and inorganic fillers, particularly clay. The papermill sludge may also contain one or more of the additive materials mentioned above.

The fibrous reinforcing material includes natural and synthetic materials in fiber or stand-like form. To minimize cost, the fibrous reinforcing material preferably is a waste or scrap material, particularly waste wood products from lumber manufacture and wood pulping operations, such as bark, shavings, veneer and pulp chips, wood pulp, flakes, and the like. Other suitable fibrous reinforcing materials include other tree components, such as leaves, evergreen needles, etc. and other cellulosic materials such as scrap paper and paperboard, rags, straw, corn stalks, hemp, flax, jute and the like. Generally, natural or processed cellulosic materials are preferred. Bark is particularly suitable and the process will be described with bark being used as a fibrous reinforcing material. The composition of the furnish and general process parameters discussed below are applicable to other reinforcing materials.

Reference is made to FIG. 3 which diagrammatically illustrates the steps of a representative process for manufacturing a pallet from papermill sludge and bark. The illustrated process broadly includes the steps of blending dried, comminuted papermill sludge with predetermined quantities of dried fibrous bark particles and a suitable resinous particle board binder, forming the resultant mixture of furnish into a loosely-felted mat, placing the mat in an open mold or press including separable male and female dies defining a mold chamber having the desired shape of the pallet, closing the mold and applying sufficient heat and pressure in the mat to compress it into substantially the desired shape of the pallet, removing the molded pallet from the press and trimming the peripheral edges of the pallet with a power saw or the like to the desired final dimensions.

The papermill sludge usually is in the form of relatively large lumps having a moisture content substantially above that acceptable for molding as discussed below. Accordingly, the papermill sludge is dried to a moisture content in the order to about 20 weight % or less, preferably about 4 to about 10 weight %, based on the dry weight of the solids, and comminuted in a suitable device, such as a hammer mill, prior to the blending step. The moisture content to which the papermill sludge is dried depends primarily upon the particular type of resin being used as discussed below. During the comminuting step, the papermill sludge preferably is broken down into a size not substantially larger than the individual wood fibers therein. If the moisture content of the papermill sludge is less than about 15%, the drying and comminuting steps can be reversed if desired and the drying step can be eliminated for papermill sludges having a moisture content less than about 10%.

While the particle size of the comminuted papermill sludge is not particularly critical, the average size generally should be about 32 to about 200 screen mesh.

Any of the fibrous reinforcing materials mentioned above can be used; however, bark presently is preferred because of its low cost, availability and ease of preparation for use in the process. Logs are usually mechanically debarked prior to being chipped or flaked for use in a pulping operation. Consequently, the manufacturing facilities producing papermill sludge usually have a readily available supply of bark.

While bark from a wide variety of hardwood and softwood species can be used, bark from species commonly used in the manufacture of paper products generally are preferred. Representative examples of suitable barks include those from aspen, maple, oak, balsam fir, pine, cedar, spruce, locust, beech and birch.

The bark from green trees has a relatively high moisture content up and usually is not in the desired fibrous or strand-like form. The bark is dried to a moisture content of about 20 weight % or less, preferably about 4 to about 10 weight %, and comminuted into a suitable device, such as a hammer mill. As with the papermill sludge, the moisture content to which the bark for any particular batch is dried depends primarily on the type of resin being used. If the moisture content of the bark is less than about 15 weight %, th drying and comminuting steps can be reversed if desired and the drying step can be eliminated for barks having a moisture content less than about 10 weight %.

During the comminuting step most barks are broken down into a fibrous fraction and a cubical-like, "corky" fraction. The portion of the bark from which each fraction is obtained varies from species to species. The "corky" particles do not significantly increase strength and preferably are separated from the more desirable fibrous fraction. This separation can be performed in a conventional air classifier. The desirable long, thin strands or fibrous bark particles tend to float, even though they may be heavier than the undesirable heavier cubical, "corky" particles, and are collected from the overhead. Mechanically removed bark usually contains some wood fibers, splinters, etc., which are collected along with the fibrous bark particles and, thus, are encompassed within the term bark particles.

The size of the fibrous bark particles is not particularly critical. They preferably have an average length of about 1/16 inch to about $\frac{3}{4}$ inches, an average width of about 0.020" to about 0.060" and an average thickness of about 0.010" to about 0.030".

Known amounts of dried papermill sludge and fibrous bark particles are introduced into a conventional blender, such as a paddle-type like blender, wherein a predetermined amount of a resinous particle binder and, optionally, additives such as water proofing agents, dimensional stabilizing agents and the like, is applied to the particles as they are tumbled or agitated in the blender. The amount of papermill sludge in the blended mixture, based on the total dry weight of the sludge and bark solids therein, preferably is about 25 to about 75 weight %, most preferably about 40 to about 60 weight %, and the amount of bark preferably is about 25 to about 75 weight %, most preferably about 40 to about 60 weight %.

Suitable binders include those used in the manufacture of particle board and similar pressed fibrous products and, thus, are broadly referred to herein as "resinous particle board binders." Representative examples of suitable binders include thermosetting resins such as phenolformaldehyde, resorcinol-formaldehyde, melamine-formaldehyde, urea-formaldehyde, urea-furfural and condensed furfuryl alcohol resins, and organic polyisocyanates, either alone or combined with urea- or melamine-formaldehyde resins. Particularly suitable polyisocyanates are those containing at least two active isocyanate groups per molecule, including diphenylmethane diisocyanates, m- and p-phenylene diisocyanates, chlorophenylene diisocyanates, toluene di- and triisocyanates, triphenylmethene triisocyanates, diphenylether-2,4,4'-trisicocyanate and polypheyl-polyisocyanates, particularly diphenylmethane-4,4'-diisocyanate.

The particular type binder used depends primarily upon the intended use for the pallet. For instance, pallets employing urea-formaldehyde resins have sufficient moisture durability for many uses which involve minimal exposure to moisture, but generally cannot withstand extended outdoor exposure and reusability is quite limited. Phenol-formaldehyde and melamine-formaldehyde resins provide good moisture resistance but require substantially longer cure times. Polyisocyanates, even in lesser amounts, provide greater srengths and moisture resistance than the urea- or phenol-formaldehyde resins and the resultant pallets can be reused for an extended number of cycles. Polyisocyanates cure in about the same time as urea-formaldehyde resins. However, polysicoyanates are more expensive and require the use of a mold release agent because of their tendency to stick to metal parts. These factors are balanced against each other when selecting the specific binder to be used.

A binder system including both a urea-formaldehyde resin and a polyisocyanate, at a solids weight ratio of about 4:1 to about 1:1, is advantageous for many applications because, although less costly than polyisocyanate alone, it provides strength characteristics and moisture resistance which is superior to those obtainable from either urea- or phenol-formaldehyde resins along and the pallets are reusable.

The amount of binder added during the blending step depends primarily upon the specific binder, used, the amount and type of fibrous reinforcing material used, and the desired characteristics of the pallet. Generally, the amount of binder added is about 2 to about 15 weight %, preferably about 4 to about 10 weight %, as solids based on the total dry weight of the papermill sludge and bark particles. When a polyisocyanate is used alone or in combination with a urea-formaldehyde resin, the amounts can be more toward the lower ends of these ranges.

The binder can be added in either dry or liquid form. To maximize coverage of the papermill sludge and bark particles, the binder preferably is applied by spraying droplets of the binder in liquid form onto the particles as they are being tumbled or agitated in the blender. To improve water resistance of the pallet, a conventional liquid wax or phenol emulsion preferably is also sprayed onto the particles during the blending step. The amount of wax or phenol added generally is about 0.5 to about 2 weight %, as solids based on the total dry weight of the papermill sludge and bark particles. Other additives such as coloring agents, fire retardants, insecticides, fungicides and resins for enhancing dimensional stability (e.g., polyethylene, polyvinylchloride, etc.) may also be added during the blending step. The binder and other additives, can be added separately in any sequence or in combined form.

The moistened mixture of papermill sludge and bark particles and binder or furnish from the blending step is formed into a loosely-felted, single or multi-layered mat which is compressed into a pallet or other molded articles. The moisture content of the papermill sludge and bark particles should be controlled with certain limits so as to obtain adequate coating by the binder during the blending step to enhance binder curing and prevent generation of excessive internal pressure during molding.

The presence of some moisture in the papermill sludge and the bark particles enhances uniform heat transfer throughout the mat during the molding step, thereby ensuring uniform curing. However, excessive amounts of water tends to degrade some binders, particularly urea-formaldehyde resins, and generates steam which can cause blisters and build up of internal pressure. At this moisture contents, the clay usually present in papermill sludge tends to form an impervious mat which inhibits release of water vapor and can cause "blow-outs." On the other hand, if the wood fibers in the papermill sludge and the bark particles are too dry, they tend to absorb excessive amounts of the binder, leaving an insufficient amount on the surface to obtain good bonding, and the surfaces tend to case harden which inhibits the desired chemical reaction between the binder and cellulose in the wood fibers and the bark particles. This latter condition is particularly true for polyisocyanate binders.

Generally, the moisture content of the furnish after completion of blending, including the original moisture content of the papermill sludge and bark particles and the moisture added during blending along with the binder, wax and other additives, should be about 5 to about 15 weight %, preferably about 8 to about 12 weight %. Generally, higher moisture contents within these ranges can be used for polyisocyanate binders because they do not produce condensation products upon reacting with cellulose in the wood fibers and the bark particles. Lower moisture contents are used for higher density pallets because of the above-discussed tendency for the clay to form an impervious mat is compounded at higher mold pressures.

In some cases the papermill sludge tends to ball up during the blending step. This can cause inadequate intermixing of the wood fibers in the sludge with the bark particles and the binder to provide the desired structural strength in the final product. In the specific process illustrated, the blended mixture or furnish is further processed in a hammermill or similar milling device to insure homogeneous mixing of the wood fibers, bark particles and binder. This additional step may not be required for blenders which also provide a milling action, such as disc-type refiners commonly used in the manufacture of fiberboard.

The furnish is formed into a generally flat, loosely-felted mat, preferably as multiple layers, having a rectangular shape generally corresponding to the outer dimensions of the pallet. A conventional dispensing system, similar to those disclosed in U.S. Pat. Nos. 3,391,223 and 3,824,058, can be used to form the mat. Generally, such a dispensing system includes a plate-like carriage carried on an endless belt or conveyor and one or more hoppers spaced along the belt in the direction of travel for receiving the furnish. When a multi-layered mat is formed in accordance with a preferred embodiment, a plurality of hoppers usually are used and each hopper has a dispensing or forming head extending across the width of the carriage for successively depositing a separate layer of the furnish as the carriage is moved beneath the forming heads.

In order to produce pallets having the desired strength characteristics, the mat should have a substantially uniform thickness. Uniformity of the mat thickness can be controlled primarily by depositing two or more layers of the furnish on the carriage and metering the flow of furnish from the forming heads. A doctor blade, scalper or similar device spaced above the carriage can be used to further control the thickness or depth of the mat.

The mat thickness varies depending on such factors as the particular technique used for forming the mat, the desired thickness and density of the molded article, the configuration of the molded article (particularly the size and shape of the leg members when the article is a pallet) and the molding pressure to be used. As a guide, the mat is usually about 3 to 15 inches thick and is quite fluffy or almost cotton-like, i.e., a density in the order of 1–5 pounds per cubic foot. When thicker mats are used, some pre-compression usually is required before the final molding step. Otherwise, the large amount of air which must be displaced, particularly for pallets having a high final density, can cause mold "blow-out." This pre-compression can be performed at relatively low pressures. For example, the mat, carried on a conveyor belt or the like, can be moved under rollers, in a manner similar to that commonly used in the manufacture of fiber board, prior to being placed in the mold.

Figure 4:
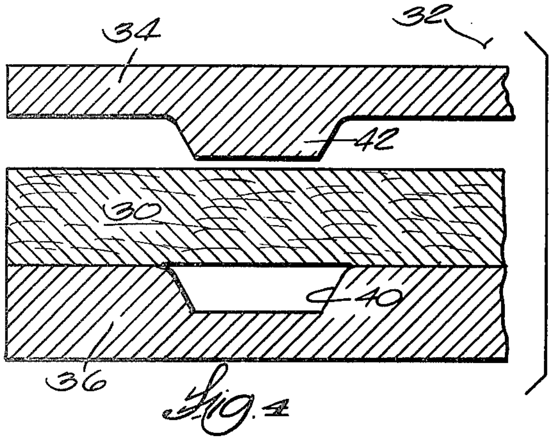
FIGS. 4–7 are simplified, schematic side views of a mold or press illustrating various techniques for depositing a mat of the papermill sludge and bark particles on the female die prior to closing the mold.

Referring to FIG. 4 which diagrammatically illustrates the dies of a pallet mold, a mat 30 (either pre-compressed or as formed) is compressed in a mold 32 including a movable male die 34 and a stationary female 36 which cooperates to define a mold chamber having the shape of the pallet and heating means. The female die 36 includes a plurality of cavities 40 (one shown), each defining the exterior of a leg member 16, and the male die 34 includes a plurality of corresponding protuberances 42 (one shown), each defining the interior of a leg member 16. When a polyisocyanate binder is used, a conventional mold release agent preferably is applied to the surface of the dies 34 and 36 or to the surfaces of the mat 30 prior to pressing.

The mat 30 is removed from the forming carriage and deposited in the female die as illustrated. When the male die is closed, portions of the mat 30 are drawn into the female die cavities 40 to form the leg members 16. Because of this drawing action on the mat during molding, there are some practical limitations for the pallet configuration. Referring to FIG. 2, the slope of the sidewalls 22 and 24 with respect to the major horizontal plane of the deck member 16, designated by angle A, should not exceed about 60°. If relatively tight corners are desired between the bottom of the deck member 12 and the leg members 16, and outer radii, designated as $R_1$, should be substantially larger than the inner radii, designated as $R_2$. Larger leg members (e.g., 7 inches×9 inches) generally are easier to mold than smaller leg members (e.g., 5 inch diameter) when the side walls have the same slope. As a general rule, the slope and depth is less for smaller leg members. The leg member side walls 22 and 24 generally are provided with a thickness which is about 70–110%, preferably about 80–85%, of the deck member thickness. The bottom wall thickness can be about 60–100% the deck member thickness.

The leg members should not be closer than about 6 inches from each other. Even at this distance, an additional quantity of the furnish may be required to compensation for that drawn down into the female die cavities during the molding operation, particularly when deeper or longer leg members are formed. For example, when a mat formed outside the mold and placed between the male and female dies as illustrated in FIG. 4 is used in the production of a 40 inch×48 inch pallet having 9 legs, leg members having a depth (designated by dimension D in FIG. 2) up to about 3 inches can be conveniently drawn from such a mat.

Figure 5:
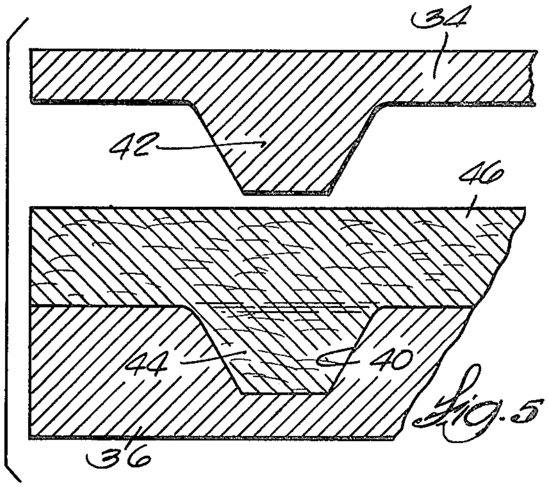
Figure 6:
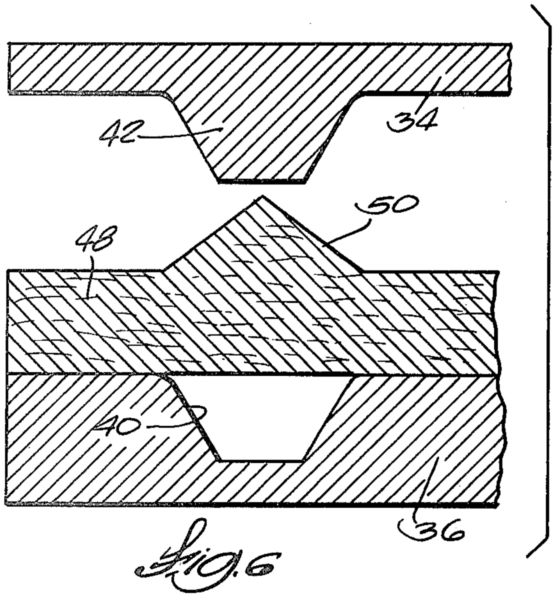
Figure 7:
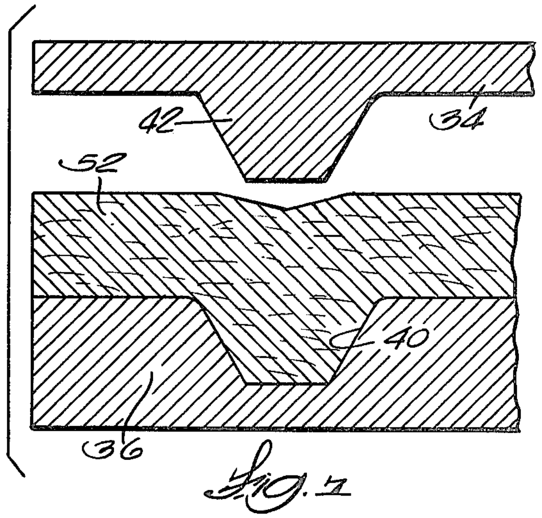

FIGS. 5–7 illustrate alternate techniques for depositing the furnish in the mold so as to permit drawing of longer or deeper leg members. In the technique illustrated in FIG. 5, the cavities 40 of the female die 36 are first substantially filled with furnish 44 and a loosely-felted mat 46, having a substantially uniform thickness and formed outside mold similar to mat 30 in FIG. 4, is deposited on the female die 36 over the filled cavities prior to closing the mold.

In the technique illustrated in FIG. 6, a loosely-felted mat 48 of substantially uniform thickness is formed outside the mold, similar to the mat 30 in FIG. 4, the mounds 50 of additional furnish required for a deep draw are deposited on top of the mat 48, at locations corresponding to the locations of the female die cavities 40, prior to placing the mat 48 in the mold.

In the technique illustrated in FIG. 7, the mat 52 is loosely felted directly onto the female die 36 by passing the female die 36 beneath the forming heads (not shown). Alternately, the mat can be deposited on a remote caul or a pan which conforms to the female die and is subsequently placed over the female die. The additional furnish required for a deep draw is provided by the tendency for the cavities 40 of the female die 36 or the caul to absorb extra furnish during the felting operation.

Molding temperatures, pressures and times vary widely depending upon the thickness and desired density of the molded article, composition and moisture content of the furnish, and the type of binder used. The molding temperature used is sufficient to at least partially cure the binder and expel water from the mat within a reasonable time period and without charring the wood and bark fibers. Generally, a molding temperature ranging from ambient up to about 450° F. can be used. When a binder system including a urea-formaldehyde resin and a polyisocyanate is used, a molding temperature of about 250° to about 375° F. is preferred while a molding temperature of about 300° to about 425° F. is preferred for phenol-formaldehyde resin binders.

The molding pressure used should be sufficient to press the papermill sludge and bark particles into intimate contact with each other without crushing the wood fibers or the fibrous bark particles. The molding pressure on the net die area typically is about 25 to about 700 psi, preferably about 100 to 500 psi. For example, a mold pressure of about 300 psi on a 10 inch mat formed from a furnish containing about 44 weight % papermill sludge, about 44 weight % bark particles, about 4 weight % moisture and about 8% resin binder, produces a molded article having a density of about 63 pounds per cubic foot.

The time of the molding or press cycle is sufficient to at least partially cure the binder to a point where the pallet has adequate structural integrity for handling. The press cycle typically is about 2 to about 10 minutes; however, shorter or longer times can be used when pressure curing binders are employed or when more complete curing of thermosetting binders is desired.

After the pallet is removed from the mold, the peripheral edges are trimmed to the desired final dimensions, e.g., 40 inches×48 inches. The mold can be provided with means which automatically trims the edges during pressing.

From comparative testing, it has been found that the addition of fibrous bark particles to papermill sludge produces surprising increases in the structural strength. For example, pallet leg sections molded from 100% sludge had an average crushing strength of 1503 pounds, wherease pallet leg sections of the same configuration molded from a 50/50 mixture of sludge and bark particles had an average crushing strength of 4941 pounds, a more than threefold increase.

From the foregoing description, one skilled in the art can easily ascertain the essential characteristics of the invention and, without departing from the spirit and scope thereof, can make various changes and modifications to adapt the invention to various usages and conditions.

We claim:

1. A method for molding an article comprising the steps of:
   (a) admixing a resinous particle board binder with a dried comminuted papermill sludge and a fibrous reinforcement material;
   (b) depositing a loosely-felted mat formed from said mixture on one open part of a mold including two separable parts defining a mold chamber having the shape of the article; and
   (c) closing the mold and applying sufficient heat and pressure on said mat to compress it to the substantially desired shape and size of the article and to bond the particles together.

2. A method according to claim 1 wherein said fibrous reinforcing material is a comminuted cellulosic material and said mixture contains about 25 to about 75 weight % of said cellulosic material.

3. A method according to claim 2 wherein said cellulosic material is fibrous bark particles.

4. A method according to claim 2 wherein the pressure applied on said mat in step (c) is within the range of about 100 to about 500 psi.

5. A method according to claim 2 wherein the temperature applied on said mat during step (c) is within the range of about 250° to about 425° F.

6. A method according to claim 3 including the step of drying said papermill sludge and said bark particles to a moisture content of about 20 weight % or less prior to step (a).

7. A method according to claim 3 wherein the amount of the binder admixed during step (a) is within the range of about 2 to about 15 weight %, as solids based on the total dry weight of said papermill sludge and said bark particles.

8. A method according to claim 3 wherein the total moisture content of said mat is within the range of about 5 to about 15 weight %.

9. A method according to claim 8 wherein the total moisture content of said mat is within the range of about 8 to about 12 weight %.

10. A method according to claim 1 wherein said article is a pallet having a deck member including a major plane and non-planar portions comprising a plurality of hollow leg members projecting integrally from said deck member, each of said leg members having a bottom wall spaced from said deck member and side walls integrally connecting said bottom wall to said deck member and inclining outwardly from said deck member toward said bottom wall.

11. A method according to claim 1 wherein
   the mold has a male and female dies; and step (b) includes
   forming said loosely-felted mat with a substantially uniform thickness outside of the mold, and
   placing said mat between the male and female dies.

12. A method according to claim 1 wherein
   the article has a base including a major plane and a non-planar portion comprising a hollow member projecting integrally from the base;
   the mold has a male die and a female die including a cavity for forming each hollow member; and
   step (b) comprises
   forming said loosely-felted mat with a substantially uniform thickness outside the mold,
   depositing a mound of said mixture atop said mat at locations corresponding to locations of each female die cavity, and
   placing said mat between the male and female dies with the mounds generally aligned with respective female die cavities.

13. A method according to claim 1 wherein
   the article has a base including a major plane and a non-planar portion comprising a hollow member projecting integrally from the base;
   the mold has a male die and a female die including a cavity for forming each hollow member; and
   step (b) comprises
   substantially filling each of the female die cavities with said mixture,
   forming said loosely-felted mat with a substantially uniform thickness outside the mold, and
   placing said mat between the male and female dies.

14. A method according to claim 1 wherein
   the article has a base including a major plane and a non-planer portion comprising a hollow member projecting integrally from the base;
   the mold has a male die and a female die including a cavity for forming each hollow member; and
   step (b) comprises
   forming said mat with a substantially uniform thickness on a remote caul having a shape conforming to the female die, and
   placing said caul over the female die.

15. A method according to claim 1 wherein
   the article has a base including a major plane and a non-planar portion comprising a hollow member projecting integrally from the base;
   the mold has a male die and a female die including a cavity for forming each hollow member; and
   step (b) comprises forming said mat with a substantially uniform thickness directly on the female die.

* * * * *